United States Patent
Starick et al.

(10) Patent No.: US 12,017,471 B2
(45) Date of Patent: Jun. 25, 2024

(54) SECURITY FEATURE AND METHOD FOR THE DETECTION THEREOF, AND SECURITY OR VALUE DOCUMENT

(71) Applicant: Bundesdruckerei GmbH, Berlin (DE)

(72) Inventors: Detlef Starick, Greifswald (DE); Manfred Paeschke, Wandlitz (DE); Florian Peters, Berlin (DE); Roland Heise, Berlin (DE); Guido Haussmann, Berlin (DE); Andreas Deichsel, Berlin (DE); Matthias Koch, Berlin (DE); Monika Voh, Breitungen (DE); Sven Rösler, Eisenach (DE); Sylke Rösler, Eisenach (DE); Adrie Bos, JS Houten (NL)

(73) Assignee: Bundesdruckerei GmbH, Berlin (DE)

( * ) Notice: Subject to any disclaimer, the term of this patent is extended or adjusted under 35 U.S.C. 154(b) by 55 days.

(21) Appl. No.: 17/921,389

(22) PCT Filed: Apr. 26, 2021

(86) PCT No.: PCT/EP2021/060869
§ 371 (c)(1),
(2) Date: Oct. 26, 2022

(87) PCT Pub. No.: WO2021/219568
PCT Pub. Date: Nov. 4, 2021

(65) Prior Publication Data
US 2023/0191826 A1    Jun. 22, 2023

(30) Foreign Application Priority Data
Apr. 27, 2020 (DE) .................... 10 2020 111 461.3

(51) Int. Cl.
*B42D 25/387*    (2014.01)
*B42D 25/29*    (2014.01)
(Continued)

(52) U.S. Cl.
CPC .......... *B42D 25/387* (2014.10); *B42D 25/29* (2014.10); *B42D 25/382* (2014.10);
(Continued)

(58) Field of Classification Search
CPC ............ C09K 11/7771; C09K 11/0811; B42D 25/387
(Continued)

(56) References Cited

U.S. PATENT DOCUMENTS

| 7,067,071 B1 * | 6/2006 | Kappe ................. C09K 11/584 428/404 |
|---|---|---|
| 2006/0230980 A1 | 10/2006 | Kappe et al. |
| 2016/0312115 A1 | 10/2016 | Starick et al. |

FOREIGN PATENT DOCUMENTS

| EP | 3083882 A1 | 10/2016 |
|---|---|---|
| WO | WO-0134723 A1 | 5/2001 |

(Continued)

OTHER PUBLICATIONS

Park et al., "White-electroluminescent device with ZnS:Mn, Cu, Cl phosphor", Journal of Luminescence, Elsevier BV North-Holland, NL, vol. 126, No. 2, May 17, 2007 (May 17, 2007), pp. 566-570, DOI: 10.1016/J.JLUMIN.2006.10.012, ISSN: 0022-2313, XP022082768.

(Continued)

*Primary Examiner* — Rafferty D Kelly
(74) *Attorney, Agent, or Firm* — Harness, Dickey & Pierce, P.L.C.

(57) ABSTRACT

The present invention firstly relates to a security feature for a security or value document. The security feature comprises a zinc sulfide luminophore in the form of particles. The zinc sulfide luminophore has the general chemical formula ZnS:$Cu_x$, $M_y$, $X_z$; here, M represents one or more elements from a group comprising the chemical elements Co, In and Ni; X
(Continued)

represents one or more elements from a group comprising the halides F, Cl, Br and I; and the following applies: $0<x<0.002$ and $0\leq y<0.00015$ and $0\leq z<0.00050$. The particles each have cubic phase portions and hexagonal phase portions. When excited by an electrical field, the zinc sulfide luminophore emits a first radiation in the range of the light spectrum between 580 nm and 780 nm. When excited by heating the luminophore to a temperature between 100° C. and 150° C., the zinc sulfide luminophore emits a second radiation in the light spectrum. Furthermore, the invention relates to a security and value document, which may for example be a bank note or a passport, an identity card, a driving license or a postage stamp. The invention also relates to a method for detecting and/or verifying the security feature according to the invention.

15 Claims, 5 Drawing Sheets

(51) Int. Cl.
  *B42D 25/382* (2014.01)
  *C09K 11/58* (2006.01)
  *G07D 7/1205* (2016.01)
  *G07D 7/202* (2016.01)

(52) U.S. Cl.
  CPC .......... *C09K 11/584* (2013.01); *G07D 7/1205* (2017.05); *G07D 7/205* (2013.01)

(58) Field of Classification Search
  USPC ......................................................... 235/491
  See application file for complete search history.

(56) References Cited

FOREIGN PATENT DOCUMENTS

| WO | WO-2010106933 A1 | 9/2010 |
| WO | WO-2015091237 A1 | 6/2015 |

OTHER PUBLICATIONS

International Search Report (English and German) and Written Opinion (German) of the ISA issued in PCT/EP2021/060869, dated Jul. 6, 2021; ISA/EP.

\* cited by examiner

SECURITY FEATURE AND METHOD FOR THE DETECTION THEREOF, AND SECURITY OR VALUE DOCUMENT

CROSS-REFERENCE TO RELATED APPLICATIONS

This application is a 371 U.S. National Phase of International Application No. PCT/EP2021/060869, filed on Apr. 26, 2021, which claims priority to German Patent Application No 10 2020 111 461.3 filed on Apr. 27, 2020. The entire disclosures of the above applications are incorporated herein by reference.

The present invention initially relates to a security feature for a security document or value document. The security feature comprises a zinc sulfide luminophore which, on the one hand, emits as an electroluminophore in the deep red spectral range and, on the other hand, exhibits further luminescence behavior. The invention also relates to a security document and value document which can be, for example, a banknote or a passport, an ID card, a driver's license, or a postage stamp. The invention also relates to a method for detecting and/or verifying the security feature according to the invention.

Zinc sulfide luminophores are among the longest-known and best-studied luminescent materials in the world. Depending on the specific material composition and the details of the luminophore synthesis, they can have completely different luminescence properties, resulting in a wide range of applications in different technical fields. ZnS luminophores have been used both as efficient photoluminophores (PL), as cathodoluminophores (CRT) for black-and-white and color picture tubes, as afterglow pigments and as electroluminophores for thin-film (TFEL) and thick-film (AC powder electroluminescence, ACPEL) films or displays.

The powdered ZnS luminophores capable of electroluminescence are usually doped with copper (Cu) and/or manganese (Mn) and also usually contain other monovalent or trivalent ions acting as coactivators, for example those of the elements Cl, Br, I, and/or Al, which can also be incorporated into the ZnS matrix. When excited with an electrical AC voltage, they luminesce preferably in the blue, green, or orange spectral range, with these luminophores usually having a preferably cubic crystal structure according to the literature (cf. SHIONOYA, S.; YEN, W. M.: Phosphor Handbook. Boca Raton, FL: CRC Press, 1999. pp. 581-621.—ISBN 0-8493-7560-6).

For the production of conventional zinc sulfide electroluminophores for ACPEL applications, multi-stage preparation processes are proposed in the technical literature, which can be modified in different ways. Such modifications also relate, for example, to the synthesis methods proposed for the preparation of fine-grained and thus printable electroluminescent ZnS powders, which are described extensively in patent specifications EP 1 151 057 B1 and EP 3 083 882 B1. In principle, the methods for the preparation of high-performance zinc sulfide EL pigments are characterized by the process steps listed below:

1. intensive mixing of the starting materials to form a mixture that is as homogeneous as possible,
2. annealing of the batch at temperatures between 800° C. and 1,300° C. in a selected annealing atmosphere (air or nitrogen or nitrogen with a hydrogen content of up to 10%),
3. grinding of the annealed material and washing with $H_2O$ and/or optional etching with diluted mineral acids,
4. post-doping of the annealed material with a specific amount of a suitable Cu source,
5. re-annealing (tempering) of the dried material mixture at temperatures between 200° C. and 900° C.,
6. re-grinding and washing of the annealed material, treatment of the annealed material with mineral acids and/or complexing agents to remove copper sulfide precipitated on the surface,
7. final tempering of the zinc sulfide luminophore powder at temperatures below 500° C., and sieving.

Steps 3, 4 and 5 primarily serve to generate $CU_xS$ precipitates on lattice defects and dislocations in the zinc sulfide matrix, which according to the unified literature view are required for efficient ACPEL electroluminescence of powdered ZnS luminophores.

The conventional technical application of zinc sulfide electroluminophores is mostly in the form of so-called electroluminescent films in which the luminophore particles are arranged in the sense of a capacitor arrangement between two electrodes and insulating layers. The electroluminescence of such EL films is usually excited with the aid of alternating electrical fields which have voltages of around 110 V and frequencies of around 400 Hz.

The zinc sulfide luminophore particles used for the preparation of such electroluminescent films are usually covered with thin water vapor barrier layers, for example made of $SiO_2$, $TiO_2$, $Al_2O_3$ or can consist of other suitable materials provided. This coating, also referred to as microencapsulation, can take place, for example, with the aid of methods such as chemical vapor deposition (CVD). Application examples for such electroluminescent films or lamps are display backlights, lighting, and marking elements, such as are used in aircraft and motor vehicles, in buildings, or for the production of advertising installations.

No technical applications of any kind could be found in the specialist literature for zinc sulfide electroluminescent luminophores doped exclusively with copper, which luminesce in the deep red spectral range with emission maxima between 580 nm and 780 nm. Electroluminescent materials of this type were mainly used in older scientific publications (cf. KRÖGER, F. A.; DIKHOFF, J. A. M.: The Function of Oxygen in Zinc Sulfide Phosphors. In: J. Electrochem. Soc. Vol. 99, 1952. pp. 144-154.—ISSN: 0013-4651; HOOGENSTRAATEN, W.: Electron Traps in Zinc-Sulfide Phosphors. In: Philips Res. Repts, Vol. 13, 1958. pp. 515-693.—ISSN 0031-7918 and GRASSER, R.; SCHARMANN, A.; WETZEL, G.: Thermolumineszenz von kubischem und hexagonalem ZnS/Cu. [Thermally stimulated luminescence of cubic and hexagonal ZnS/Cu.] In: Z. Naturforsch., Vol. 28a, 1973, No. 12, pp. 1378-1379.—ISSN 0932-0784), but also described, for example, in the "Phosphor Handbook" cited above. Reviewing this literature, it becomes clear that there is still a great deal of uncertainty regarding the efficiency of this type of electroluminescence and the mechanisms and radiation centers responsible.

The use of powdered ZnS electroluminophores to protect security documents and documents of value, such as banknotes, passports, ID cards, driver's licenses etc. from forgery, was first described in patent specification EP 0 964 791 B1. It was already assumed in this patent specification that the necessary zinc sulfide electroluminescent pigments should be arranged on or in the matrix of the respective security documents using the usual printing technologies, such as corresponding gravure, flexo, offset, or screen printing methods, without striving for the conventional, classic capacitor construction. Further investigations provided evidence that this is possible and that the authenticity of the electroluminophores applied in this way to or in the security documents or documents of value can also be verified by the contactless introduction of the alternating electric field to the luminescence pigments (compare EP 1 059 619 B1, EP 1 149 364 B1, and DE 10 2008 047 636 A1).

However, in such a case, comparatively high-frequency, high-voltage alternating fields are required in order to ensure reliable stationary or advantageously high-rate detection of the resulting luminescence signals. On the other hand, it was also found in this context that the combination of suitable EL pigments with so-called field displacement elements can increase the local field strength effective on the surface of the luminophore particles and thus reduce the external high voltage imposed without contact. These relationships are comprehensively described in patent specifications EP 1 631 461 B1 and EP 1 748 903 B1, for example.

A decisive prerequisite for the technical feasibility of printable and reliably verifiable electroluminescent security features is the availability of correspondingly fine-grained luminophores with high signal strength, high aging resistance, and preferably exclusive luminescence behavior. Electroluminophores in powder form that are suitable in this way are disclosed, for example, in EP 1 151 057 B1. In this patent specification, methods for the preparation of blue and green emitting EL pigments with an exclusively cubic crystallite structure and mean grain sizes between 2 μm and 5 μm or 5 μm and 15 μm are presented, the suitability of which for the creation of printed security features could be proven.

Other luminophores suitable for producing electroluminescent security features by printing are described in EP 3 083 882 B1. In addition to their specific blue electroluminescence, the powdered zinc sulfide luminophores named in this patent specification exhibit an intense photoluminescence which can therefore be detected with the aid of conventional sensors and is also characterized by a characteristic blue-green color change in the emission when the UV excitation conditions are varied.

The object of the present invention is to provide a security feature suitable for a security or value document with a zinc sulfide electroluminophore which, because of its special luminescence properties, differs in an exclusive way from the EL pigments used in different technical fields. The object of the invention is also to provide a method for detecting and/or verifying such a security feature. In addition, a corresponding security or value document is to be provided.

Said object is achieved by a security feature according to the appended claim 1, by a security or value document according to the appended independent claim 10, and by a method according to the appended independent claim 11.

In the following, some terms are first defined as they are understood within the meaning of the invention.

The electromagnetic radiation emitted by a physical system during the transition from an excited state to the ground state is referred to as luminescence. As a rule, luminescence relates to the conversion of higher-energy to lower-energy radiation (down-conversion), with the difference between the wavelength of the absorbed radiation and the wavelength of the emitted radiation being referred to as the Stokes shift. Depending on the character of the exciting radiation and the spectral range of the emitted electromagnetic radiation, different types of luminescence (for example photoluminescence, cathodoluminescence, X-ray luminescence, electroluminescence, etc.) are distinguished.

Anti-Stokes luminescence (up-conversion) is a special case of luminescence in which emission occurs in a higher-energy spectral range, for example in the visible light range, after previous, possibly multi-stage infrared (IR)-induced stimulation or excitation.

Electroluminescence is a special form of luminescence in which inorganic or organic solids are excited to emit electromagnetic radiation, for example in the visible spectral range, by applying electrical DC or AC voltage fields. In the present invention, the term electroluminescence is exclusively used for the luminescence of powdery inorganic luminophores that can be excited with the help of alternating electrical fields (engl.: AC powder electroluminescence, ACPEL).

Luminophores are organic or inorganic chemical compounds which show luminescence when excited by electromagnetic or particle radiation or when excited by electric fields. In order to make this possible, activator ions acting as radiation centers and optionally additional coactivator ions are built into the luminophore basic lattice (luminophore matrices) formed by the chemical compounds. These luminophores are often in the form of solids, in particular in the form of pigments. The electroluminescent luminophores described in connection with the present invention are also variously referred to as electroluminophores or electroluminescent (EL) pigments. The chemical compound zinc sulfide (ZnS) is the most commonly used luminophore matrix for the preparation of ACPEL pigments.

In principle, two structure types are characteristic of the crystal structure of the ZnS particles, on the one hand the cubic sphalerite structure, which is stable below the phase transition temperature of around 1,020° C., and the hexagonal wurtzite structure, which is stable above around 1,020° C. On the other hand, according to the literature (cf. WITHNALL, R. et al.: Structure and Morphology of ACEL ZnS: Cu, Cl, Phosphor Powder Etched by Hydrochloric Acid. In: J. Electrochem. Soc., Vol. 156, 2009, No. 11, pp. J326-J332.—ISSN 0013-4651) the zinc sulfide can be regarded as a prime example for the occurrence of polytypic structural modifications, which result from the large number of possible stacking sequences and from the strong tendency to twin crystal formation. In the literature, it is assumed that the chemical compound zinc sulfide can form over 185 different polytypes.

The structural status of different ZnS luminophores depends on the specific composition of the materials and the manufacturing conditions (cf.: GOBRECHT, H.; NELKOWSKI, H.; ALBRECHT, P.: Zur Kristallstruktur der Zinksulfide [On the crystal structure of zinc sulfide]. In: Z. Naturforsch., Vol. 16a, 1961, No. 9, pp. 857-860.—ISSN 0932-0784; WITHNALL, R. et al.: Structure and Morphology of ACEL ZnS: Cu, Cl Phosphor Powder Etched by Hydrochloric Acid. In: J. Electrochem. Soc., Vol. 156, 2009, No. 11, pp. J326-J332.—ISSN: 0013-4651 and IRELAND, T. G.; SILVER, J.: Studies on the Orientations of ACEL ZnS: Cu Particles in Applied AC Fields. In: ECS Journal of Solid State Science and Technology, Vol. 3, 2014, pp. R25-R32.—ISSN 2162-8769). In addition to pure-phase cubic or rather rarely encountered pure-phase hexagonal zinc sulfide luminophore powders, ZnS luminophores can also be synthesized using the various influencing factors, which have different cubic-hexagonal phase portions. The exact determination of these phase portions can be carried out with the help of suitable X-ray diffractometers (XRD).

Optical radiation refers to that wavelength range of electromagnetic radiation that is located between that of X-rays and that of microwaves. It therefore comprises the range of UV radiation, that of visible light, and that of infrared radiation, and thus the wavelength range between 100 nm and $10^6$ nm (1 mm).

Ultraviolet (UV) radiation covers the wavelength range from 100 nm to 380 nm. A distinction is usually made between what is known as UV-A radiation (380 nm to 315 nm), UV-B radiation (315 nm to 280 nm), and UV-C radiation (280 nm to 100 nm).

Visible light (VIS) is that part of the electromagnetic spectrum that can be perceived by the human eye. For the normal observer, this range comprises the wavelengths between 380 nm and 780 nm.

For the subdivision of the wavelength range from 780 nm to $10^6$ nm (1 mm) of infrared (IR) radiation, there are different approaches in the technical literature. As a rule, a distinction is made between near infrared (NIR) (780 nm to 3,000 nm), medium (3,000 nm to 50 μm), and far IR (50 μm to 1 mm), with the NIR range often still being divided in the IR-A- (780 nm to 1,400 nm) and the IR-B range (1,400 nm to 3,000 nm).

An emission spectrum describes the spectral intensity distribution of the electromagnetic radiation emitted by the luminophores at a fixed excitation wavelength. Such an emission spectrum can consist of emission lines and/or emission bands.

An excitation spectrum illustrates the dependence of the intensity of the radiation emitted by a luminophore at a fixed wavelength on the wavelength of the excitation radiation. The measured intensity is influenced both by the efficiency for the absorption of the excitation radiation and by the efficiency of the radiation conversion.

Thermoluminescence (thermally stimulated luminescence, TSL) refers to the appearance of luminescence (emission of visible light) that can occur when a solid is heated. The supply of thermal energy causes the liberation of electrons previously trapped in so-called lattice traps after excitation with electromagnetic or ionizing radiation and stored over a longer period of time and their radiant return to the ground state. The graphical representation of the dependency of the luminescence intensity on the increasing temperature during the heating process is referred to as the glow curve.

As an alternative to thermal activation, the release of the electrons trapped by certain solids in traps can also be achieved by exciting the materials with optical radiation of adequate energy. The emission of visible light that occurs as a result of such an activation is referred to in the specialist literature as optically stimulated luminescence (OSL).

Especially in the 1950s to 1970s, numerous test results on the thermally stimulated luminescence behavior of zinc sulfide luminophores were published in the specialist literature (cf., for example, the reviews by HOOGENSTRAATEN, W.: Electron Traps in Zinc-Sulfide Phosphors. In: Philips Res. Repts, Vol. 13, 1958, pp. 515-693.—ISSN 0031-7918 and GRASSER, R.; SCHARMANN, A.; WETZEL, G.: Thermolumineszenz von kubischem und hexagonalem ZnS/Cu. [Thermoluminescence of cubic and hexagonal ZnS/Cu.] In: Z. Naturforsch., Vol. 28a, 1973, No. 12, pp. 1378-1379.—ISSN 0932-0784). However, the authors' academic interest was primarily focused on the glow peaks that occur at comparatively low temperatures ($T_{max}$<273 K).

The security feature according to the invention is designed to be used as a criterion for authenticity in a security document or in a document of value. The authenticity of the security document or the document of value can be checked by detecting or verifying the security feature.

The security feature comprises a powdered, zinc sulfide luminophore in which the structure of the individual luminophore particles is characterized by preparatively adjusted cubic and hexagonal phase portions and which, in addition to electroluminescence that can be excited by alternating electrical fields, has other special luminescence properties. In addition to its electroluminescence, this luminophore also exhibits a reliably detectable, exclusive thermally stimulated luminescence characteristic to a particular degree, which will be explained in more detail below.

The basic idea of the invention is to provide a zinc sulfide electroluminophore for use in security features which, in addition to its efficient electroluminescence, which occurs predominantly in the deep red spectral range, is characterized by other special, verifiable luminescence properties and exhibits, in addition to electroluminescence, in particular a stable, detectable, and distinguishable thermally stimulated luminescence (TSL). It has been shown that an essential prerequisite for the occurrence of a first luminescence radiation, namely efficient electroluminescence in the spectral range between 580 nm and 780 nm, and the simultaneous presence of a second luminescence radiation different from the first luminescence radiation, namely a reliably verifiable thermal or optical stimulable luminescence, consists in selecting and optimizing the synthesis conditions for the preparation of the zinc sulfide electroluminophore in the form of electroluminescent pigments in such a way that these pigments each have both cubic and hexagonal phase portions. This is the only way to ensure that, in the exclusive ZnS electroluminophore, in addition to the radiation centers required for efficient electroluminescence, comparatively deep-seated traps are formed that are able to sustainably store exciting radiation energies over a longer period of time and are not prematurely emptied by so-called afterglow processes. The thermal stimulation of the energies stored in the form of electrons in the traps then results in the generation of measurable thermally stimulated luminescence signals, with the corresponding glow curves preferably having maximum temperatures of $T_{max}$>100° C.

When investigating the luminophores suitable for the security features according to the invention, it was also possible to experimentally prove that the electrons stored in the traps of the zinc sulfide electroluminophores can also be returned to the basic state by stimulation with suitable optical radiation. On this basis, it is possible, as an alternative to exclusive thermally stimulated luminescence, to use the likewise exclusive optically stimulable luminescence (OSL) of the same zinc sulfide electroluminophores as a criterion for authenticity in security features.

By using the named effects in the invention, the exclusivity of the security feature according to the invention is increased in comparison to the prior art, and its possible uses are expanded. On the basis of the electroluminescent pigments described, it is possible to provide the exclusive security feature according to the invention, which has additional security-relevant properties that are independent of its level 3 characteristic and can also be used for authenticity testing. The signals required for reliable verification of these properties can be determined both forensically and read out by machine.

The zinc sulfide luminophore used in the security feature according to the invention has the general formula:

$$ZnS: Cu_x, M_y, X_z$$

Herein, Cu designates the chemical element copper, while the symbol M stands for one or more elements selected from a group comprising the chemical elements cobalt (Co), indium (In), and nickel (Ni). The symbol X represents one or more elements selected from a group comprising the halides fluorine (F), chlorine (Cl), bromine (Br) and iodine (I). The following relationships apply to the listed indices:

$0<x\leq 0.002$
$0\leq y\leq 0.00015$
$0\leq z\leq 0.00050$

In an alternative notation, the general chemical formula given above for the zinc sulfide luminophore can also be written as:

$$(Zn_{1-x-y-d}\,Cu_x\,M_y\,\square d)\,(S_{1-z-e}\,\square_e\,X_z),$$

the symbol □ denoting the lattice defects or interstitial sites formed for the purpose of charge equalization during the synthesis of the luminophore and the associated indices d and e denoting their respective proportions.

In a preferred embodiment of the security feature, the zinc sulfide luminophore used has the composition:

$ZnS: Cu_x, Co_y,$ with $0<x<0.002$ and $0<y\leq 0.00015$.

In a further special embodiment of the security feature, the zinc sulfide luminophore is doped exclusively with copper and can be described by the general formula:

$ZnS: Cu_x$

The molar proportions of the Cu doping can assume values of $0<x<0.002$.

The zinc sulfide luminophore described is distinguished by a high efficiency of the achievable electroluminescence yields and by likewise high thermally stimulated luminescence and/or OSL signal strengths. At the same time, it has high stability and aging resistance to environmental influences. Both aspects are of great importance for the reliable verifiability of the security feature according to the invention based on the described zinc sulfide luminophore over the entire life cycle of the corresponding security documents or value documents.

Depending on the preparative conditions, the particles of the zinc sulfide luminophore in the form of luminophore powder preferably have an average particle size of between 2 μm and 50 μm, particularly preferably between 2 μm and 20 μm. On this basis, it is possible to apply these particles to and/or in the value and security documents using the usual printing technologies, such as the known gravure printing, flexographic printing, offset printing, or screen printing processes, or also with the help of other types of coating and lamination methods to form the security feature according to the invention. The relevant value and security documents can be banknotes, identity cards, passports, and driver's licenses, but also, for example, service cards such as bank or credit cards, etc.

The emission spectra of the variants of the described zinc sulfide luminophore that luminesce with high intensity when excited with alternating electric fields each consist preferably of only one emission band, the spectral extension of which covers the wavelength range from 480 nm to 880 nm and preferably from 580 to 780 nm. The intensity maxima of these comparatively extremely broadband emissions are preferably in the range from 640 nm to 660 nm. The half-value widths of the emission bands are preferably between 180 nm and 240 nm.

The authenticity check of the security feature according to the invention, aimed at detecting the exclusive electroluminescence, can be carried out using known methods for verifying electroluminescent features with level 3 characteristics. The exclusive emission of the zinc sulfide luminophore occurring in the deep red spectral range between 580 and 780 nm is also to be regarded as advantageous because of its good agreement with the spectral sensitivity of the silicon (Si) sensors usually used for detection. As described in the prior art, the signal strength of the electroluminescence can also be further increased in the case of the security feature according to the invention by combining the EL pigments with so-called field displacement elements.

In addition to the exclusive, stationary electroluminescence described, the zinc sulfide luminophore described exhibits characteristic luminescence phenomena after prior excitation, which can be observed and measured when it is heated. This special type of luminescence, which is linked to the presence of specific traps in the respective luminophore basic lattice and is based on the liberation of the electrons or stored energies stored in these traps and their return to the ground state, is referred to in the specialist literature as thermoluminescence (TSL). The temperature dependence of the intensity of the light emitted as a result of the supply of thermal energy can be recorded in the form of so-called glow curves.

The TSL glow curves of the various variants of the zinc sulfide luminophore described have maximum temperatures of more than 100° C., particularly preferably in the range from 120° C. to 150° C. They differ significantly from the glow curves determined for conventional ACPEL luminophores, which are used, for example, in thick-film electroluminescent displays and for which maximum temperatures in the range from 30° C. to 70° C. were measured. Traps that are responsible for the occurrence of glow peaks in the last-mentioned temperature range can be emptied comparatively quickly, for example through fluctuations in room temperatures or as a result of other factors and mechanisms, and therefore give rise to the occurrence of temporary, so-called afterglow processes, for which alternatively in the literature also uses the terms afterglow or phosphorescence.

The zinc sulfide luminophore described, on the other hand, is able to safely store parts of the excitation radiation over a longer period of time, so that the stored information can be read out under defined conditions by adding thermal energy in the form of a reproducible, exclusive glow curve as an additional criterion for authenticity for the presence of the security feature according to the invention.

The traps responsible for the exclusive thermally stimulated luminescence characteristics of the zinc sulfide luminophore described are preferably filled by excitation with ultraviolet radiation. The optimal wavelength for UV irradiation can be determined experimentally by measuring the TSL excitation spectra. It has been found that the wavelength of the exciting UV radiation for the zinc sulfide luminophore described is preferably in the range of less than or equal to 340 nm in order to be able to achieve the highest possible signal strengths when reading out the thermally stimulated luminescence.

A further finding relates to the emission spectrum of the second luminescence radiation, namely the thermally or optically stimulated luminescence of the luminophore in the security feature according to the invention. In contrast to the deep red stationary electroluminescence, this emission spectrum has emission bands positioned in the green spectral range with maxima in the range from 520 nm to 550 nm.

A particularly important result of the various investigations carried out is the fact that it was possible within the scope of the invention to prove experimentally that the verification of the exclusive thermally stimulated luminescence signals of the security feature according to the invention can also be carried out securely on the value and security documents equipped with the appropriately configured security features, such as banknotes, ID cards, passports and driver's licenses, or bank or credit cards. At the same time, it could be shown that all relevant carrier materials used for creating the respective value and security documents withstand the thermal treatment required for repeated reading of the TSL signals up to temperatures of 250° C. without damage. No damage whatsoever was found to these materials and to the designs and security features of a different nature placed on and within them. The thermal stability of the various carrier materials in the temperature range relevant for the thermally stimulated luminescence measurements could also be verified with the help of thermoanalytical investigation methods.

In addition, the investigations on commonly used banknote substrates, which were coated with security features according to the invention for investigation purposes, revealed that when the traps responsible for the exclusive thermally stimulated luminescence of the features are repeatedly filled and read, glow curves can be measured that are characterized by sufficiently high luminescence intensities and do not differ from the curves measured on powder samples of the luminophore described in relation to the shape of the curve and the characteristic $T_{max}$ values.

For the reproducible recording of the characteristic glow curves, it is also recommended, although not absolutely necessary, to first remove the energies accidentally stored in the luminophore during its use, for example by daylight excitation, by targeted heating before the start of the measurement. A new excitation then takes place under defined conditions.

The emptying of the special traps of the zinc sulfide luminophore described, which is associated with the luminescence effects described, can also be carried out by targeted optical stimulation (OSL) without the addition of thermal energy. The optical stimulation should be carried out with the help of suitable lasers in order to achieve sufficiently high and reliably detectable signal strengths. The stimulation wavelengths required for the efficient optical stimulation of the trapped charge carriers can be determined experimentally.

In contrast to the glow curves typical of thermally stimulated luminescence, characteristic decay curves are usually measured for optically stimulated luminescence and recorded as an authentication feature. As the investigations carried out in this context have shown, a particularly favorable signal-to-noise ratio can be achieved with optical stimulation of the energies stored by the zinc sulfide luminophore after 340 nm excitation, for example, if the stimulation wavelength of the laser is around 750 nm.

Since the emission maximum of the optically stimulated luminescence of the described zinc sulfide luminophore, as in the case of its thermally stimulated luminescence, is in the green spectral range between 520 nm and 550 nm, this type of radiation conversion can also be regarded as anti-Stokes luminescence.

The properties of the zinc sulfide luminophore given in the variants shown here can be realized both using exclusively copper-doped variants according to the general formula $ZnS:Cu_x$, as well as on the basis of luminophore variants which, in addition to the copper activator ions, have other coactivators such as for example cobalt, indium, nickel, or additionally selected halide ions. However, the additional incorporation of cobalt ions in the ZnS:Cu matrix in particular results in an increase in the efficiency of the different characteristic luminescent processes of the luminophore, to stabilization of the electroluminescence occurring in the deep red spectral range, and to a safe positioning of the temperature maxima of the glow curves for thermally stimulated luminescence in the desired range between 120° C. and 150° C.

The exclusive TSL or OSL characteristics of the zinc sulfide luminophore based on the storage of the excitation energies can be used as additional authenticity criteria for the authentication of value and security documents. This means that they can also be used, for example, instead of the high-security feature "electroluminescence" for authenticity verification, in particular when technical circumstances, environmental regulations, or security regulations do not allow to realize, with high-frequency electrical high-voltage alternating fields, the excitation of the electroluminescent pigments required to prove the exclusive electroluminescence of the security feature according to the invention.

It is also possible to use the additional exclusive TSL or OSL features in the event of failure or blocking of the energy transmission mechanisms required for detecting the electroluminescence or in the case of suspected forgeries to assess the authenticity of the corresponding value and security documents.

Herein, the presence of the features can be checked both forensically using appropriate technical aids in the laboratory or also by machine, for example with the help of appropriately configured banknote checking devices.

It has already been pointed out that a crucial prerequisite for the manifestation of the exclusive luminophore properties of the security feature according to the invention is that the synthesized luminophore particles each have both cubic and hexagonal phase portions.

Therein, the different phase portions of the zinc sulfide luminophore obtained under special preparation conditions are apparently structurally connected to one another in terms of the occurrence of possible growth or adhesion processes, which can be concluded from this that the correspondingly configured luminophore particles, unlike in the case of mechanical mixing of, for example, pure-phase cubic and pure-phase hexagonal copper-activated ZnS particles, are characterized by uniform luminescence characteristics. Extensive investigations into the relationships between the structural status of the luminophore samples determined with the help of X-ray diffractometric methods and the luminophore properties have shown that both the emission spectra of the electroluminescence of the luminophores and the position of the temperature maxima of the exclusive TSL glow curves and the characteristic form of the decay curves of the optical stimulated luminescence depend to a considerable extent on the expression of the hexagonal phase portions. In this context, it was possible to determine that the relative hexagonal phase portions in the individual particles of the zinc sulfide luminophore are preferably on average greater than 10%, more preferably on average greater than 20% and particularly preferably on average in the range between 20% and 40% in order to ensure that these particles exhibit electroluminescence occurring in the deep red spectral range and at the same time have distinguishable exclusive glow curves for thermally stimulated luminescence with temperature maxima in the range from 120° C. to 150° C.

For the preparation of the zinc sulfide luminophore described, the multi-stage synthesis processes known from the prior art are first used. However, in order to be able to preparatively set the cubic-hexagonal phase structure of the ZnS luminophore particles, which is to be regarded as a prerequisite for the realization of the desired exclusive luminescence properties, the preparation conditions must be configured in a special way. It has been shown that the thermal processes of the preparation process are of importance for the development of this special crystal structure. These primarily relate to the high-temperature annealing process and the design of the subsequent cooling regime, as well as the tempering steps that are usually additionally carried out in the course of processing the annealed material obtained.

Since the temperature for the phase transformation of the cubic sphalerite structure into the hexagonal wurtzite structure of zinc sulfide is around 1,020° C. according to literature, the high-temperature annealing of the mixture of starting materials for the luminophore synthesis, which is positioned in special crucibles in appropriate annealing furnaces, must take place well above this temperature in any case, in order to enable the complete conversion of the starting materials and thus initially the complete formation of hexagonal zinc sulfide luminophore particles.

Slow cooling of the annealed material would promote the reconversion of the hexagonal ZnS pigments formed at the high temperatures into the thermodynamically predetermined cubic crystal structure. On the other hand, rapid cooling is the only way to ensure that the hexagonal structural disposition of the crystallites is retained, at least in part.

It has been shown that annealing temperatures in the range between 1,100° C. and 1,300° C., preferably above 1,200° C., are required to realize the exclusive luminescence properties of the zinc sulfide luminophore usable for the security feature according to the invention.

In order to ensure that hexagonal structural components of preferably 20% to 40% are retained by rapid cooling of the synthesized luminophore particles after the cooling process has ended, it is helpful to optimize the cooling process and to define measures for realizing the required cooling rate. The optimal constellation between the annealing temperature and the cooling regime depends on numerous factors. These factors include, for example, the type of starting materials used for the synthesis of the zinc sulfide luminophores, the type of preparation, but also other technological aspects such as the furnace geometry, the furnace atmosphere, the type of crucible, the crucible size, etc. However, a person skilled in the art is able to adjust the cooling regime in such a way that the synthesized luminophore particles finally have the desired hexagonal phase portions, taking into account the technical conditions and on the basis of the optimization tests carried out.

It should also be pointed out at this point that, with regard to the relationships described, there are major differences between the synthesis of relevant luminophore samples on a laboratory scale and the preparation of corresponding production batches under industrial conditions. As already mentioned, the determination of the resulting cubic-hexagonal phase portions of the annealed products, which is required for the optimization of the annealing and cooling processes, can be carried out with the aid of X-ray diffractometric measurements.

In principle, the tempering steps that are usually carried out must also be included in the special configuration of the thermal processes used for the preparation of the luminophore.

The repeated tempering of the processed annealed products usually takes place in two separate steps at temperatures that are well below the temperature characteristic of the cubic-hexagonal phase transformation of zinc sulfide. They are carried out in order to partially repair lattice defects that generally occur in an uncontrolled manner during the after-treatment of the obtained annealed products as a result of the mechanical (grinding and sieving process) and chemical (etching processes using mineral acids such as HCl and HNO$_3$) stress of the synthesized luminophore in order to be able to improve the efficiency of the resulting luminescent processes.

However, it must be taken into account that a longer thermal treatment, for example at temperatures between 200° C. and 900° C., in the case of the zinc sulfide luminophore synthesized under special conditions, has been proven to result in a reconversion of the intentionally produced hexagonal structure parts in favor of the expression of a preferentially cubic crystal symmetry of the luminophore particles.

The security and/or value document according to the invention can be, for example, a banknote or a passport, an ID card, a driver's license, a postage stamp, a tax stamp or even service cards such as bank or credit cards. The security and/or value document has the security feature according to the invention. The security and/or value document preferably has one or more embodiments of the security feature according to the invention. The security feature can be applied to or incorporated in the security and/or value document in different ways. The security feature is preferably applied into and/or onto the security or value document with the aid of a printing technology, for example a gravure printing, offset printing, or screen printing process or else with the aid of coating and lamination methods. The security and/or value document preferably also has features that are described in connection with the security feature according to the invention.

In addition to the security feature according to the invention, additional field displacement elements are preferably also arranged in the security or value document according to the invention. The field displacement elements are electrically conductive and electrically insulated within the security or value document. They have a high dielectric constant. They are preferably arranged in the immediate vicinity of the zinc sulfide luminophore particles. The field displacement elements preferably consist of metallic particles such as iron (Fe), copper (Cu), aluminum (Al), and/or silver (Ag), or also transparent, optically variable multilayer effect pigments. The field displacement elements serve to increase the local field strength of the electric field effective on the zinc sulfide luminophore.

The security feature preferably has high processing stability and high aging resistance to environmental influences. Stability and resistance to aging are necessary in order to ensure reliable verifiability of the security feature over the entire life cycle of the security document.

A further subject matter of the invention is a method for detecting and/or verifying the security feature according to the invention in a security or value document. The method is preferably designed to detect and/or verify one of the described embodiments of the security feature according to the invention.

A first portion of the method relates to the detection of the characteristic electroluminescence of the zinc sulfide electroluminophore used to form the security feature according to the invention. In a first step, the security feature placed on/or in a security or value document is excited by an alternating electric field, preferably by a high-frequency high-voltage alternating field, which has an AC voltage of 30 kV and a frequency of 30 kHz, for example. Using suitable optical sensors, it is checked in a second method step whether the security feature is electroluminescent and whether this electroluminescence is characterized by a first luminescence radiation in the deep red spectral range between 580 and 780 nm. This test can be carried out by directly measuring the emission spectrum of the luminophore or by verifying authenticity parameters that can be calculated on the basis of this spectrum. By using an alternating electric field equipped with a high frequency as an excitation source for the electroluminescence, the possibility is created at the same time of advantageously detecting the luminescence signals required for the authenticity assessment at high readout rates.

A second portion of the method according to the invention relates to the verification of the characteristic thermally stimulated luminescence (TSL) or the characteristic optically stimulated luminescence (OSL) of the security feature. For this purpose, in a first step of this second section, the traps responsible for the thermally stimulated luminescence or optically stimulated luminescence are filled by excitation with UV radiation of a selected wavelength, preferably in the range of ≤340 nm. In a second step of this section, the energies stored in the traps are read out by thermal or optical stimulation.

In one embodiment of the method that uses thermal stimulation, this is done by heating the security feature in a targeted manner, preferably up to a maximum temperature of 250° C. In a third step, it is checked whether a second luminescence radiation is emitted as a result of the thermal stimulation.

In the case of thermal stimulation, the TSL glow curve of the luminophore, which is characteristic of the feature, can be recorded with temperature maxima of greater than 100° C. and particularly preferably in the range from 120° C. to 150° C. for the purpose of authenticity verification. This glow curve characterizes the dependence of the integral intensities of the thermally stimulated luminescence signals read out on the heating temperature.

A further increase in the reliability of detection can be achieved in that the emission spectrum of the thermally stimulated luminescence is also included in the authenticity assessment of the security feature in parallel or in addition to the measurement of the glow curve. This emission spectrum, i.e., that of the second luminescence radiation, preferably has an emission band positioned in the green spectral range between 520 nm and 550 nm.

According to a modified embodiment of the method for detecting and/or verifying the security feature, the optically stimulated luminescence (OSL) is measured and evaluated as an alternative to thermally stimulated luminescence. In this embodiment, too, in a first step of the second stage of the method, the lattice traps of the luminophore are first filled, preferably by excitation with the aid of UV-B radiation of less than or equal to 340 nm; the subsequent emptying of the traps, which forms the second step, then takes place but in contrast to thermally stimulated luminescence not by thermal but by a targeted optical stimulation of the luminophore. Investigations have shown that a particularly favorable signal-to-noise ratio can be achieved when verifying authenticity in this respect, in particular if the stimulation wavelength of the laser used for the purpose of optical stimulation is around 750 nm.

In contrast to the glow curves typical of thermally stimulated luminescence, the optically stimulated luminescence according to the third step of this method section provides a characteristic decay curve as an authentication feature. However, the spectral distribution of the radiation emitted after optical stimulation corresponds to that which is also characteristic of the emission spectrum of thermally stimulated luminescence.

To ensure high reproducibility in the detection of the luminescence characteristics based on the storage processes described, i.e. both thermally stimulated luminescence and optically stimulated luminescence, it is advantageous to first check the security feature, which comprises the zinc sulfide luminophore, before the start of the excitation and test steps up to about 250° C. in order to randomly remove energies stored in the traps, for example by appropriate daylight excitation.

Furthermore, it is advantageous to wait a few seconds between the UV excitation and the beginning of the thermal or optical stimulation of the energies or charge carriers stored in the traps, in order in this way to allow any phosphorescence processes that may occur to subside.

The different sections of the detection method described can be carried out consecutively or alternatively to one another, i.e., the occurrence of the first luminescence radiation can be checked first and then the occurrence of the second luminescence radiation. Likewise, the specified method sections can be carried out separately from one another in terms of time and space.

Therein, the method portion for verifying the electroluminescence (first luminescence radiation) has the advantage that it can also be implemented as a method for high-rate detection of security features and can therefore also be used, for example, in corresponding banknote sorting systems.

The alternative method portions for detecting the TSL or OSL characteristics, on the other hand, are used in particular when technical circumstances, environmental regulations, or safety regulations do not allow the electroluminescence of the security features to be checked with high-frequency electrical high-voltage alternating fields.

The additional examination of an occurring second luminescence radiation, which is based on the storage functionality of the luminophore used in the security feature according to the invention, results in a further increase in the forgery security of the corresponding value and security documents. This makes it possible to prove the authenticity of these documents even in the case of questionable or ambiguous results in the detection of the electroluminescence or in the case of suspected forgeries.

Therein, the verification of the TSL signals can be carried out both forensically in the laboratory or, despite the time expenditure associated with the necessary baking of the features, by machine, for example with the aid of appropriately configured banknote verification devices.

In any case, optically stimulated luminescence is machine-readable because the processes required to measure the OSL signals run at a significantly higher rate.

Further details, advantages, and special features of the invention are explained in more detail below on the basis of preferred embodiments of the invention with reference to the drawings, in which.

Figure 1:
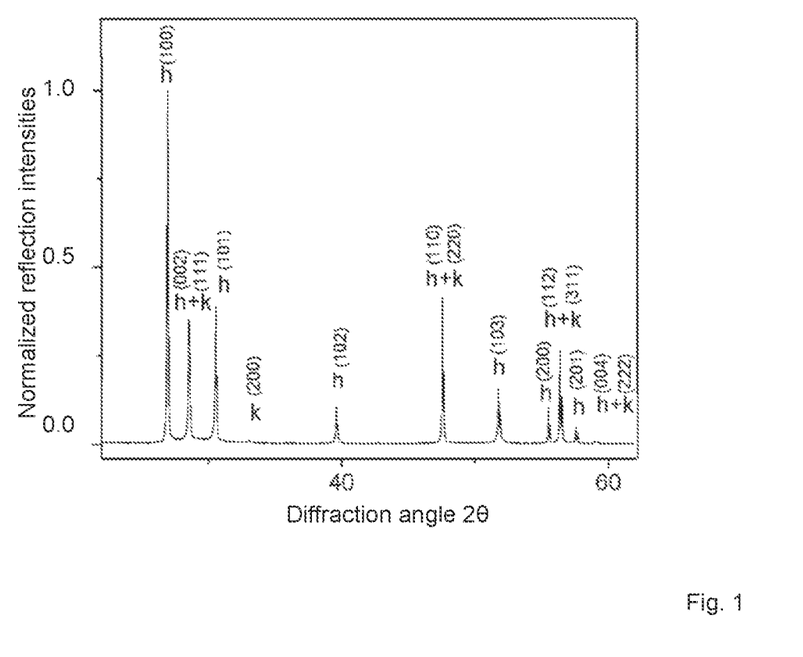
FIG. 1 shows an X-ray diffraction diagram of a zinc sulfide luminophore, also referred to below as reference luminophore, of a preferred embodiment of a security feature according to the invention.

FIG. 1 shows an X-ray diffraction diagram of a zinc sulfide luminophore (reference luminophore) of a preferred embodiment of a security feature according to the invention. In this embodiment, the reference luminophore used is a zinc sulfide luminophore activated exclusively with copper. The synthesis of this luminophore with the desired composition ZnS:Cu$_{0.0005}$ is explained below by way of example using an embodiment.

For the preparation of the luminophore, 399.3 g of a high-purity powdered zinc sulfide are intensively mixed with 0.25 g of previously ground CuSO$_4$ and sieved through a 100 μm sieve to further improve the homogeneity of the mixture. The batch mixture is then transferred to a corundum crucible and heated to 1,200° C. in a chamber furnace at a rate of 15 K/min. After three hours of high-temperature annealing in a forming gas atmosphere with a hydrogen content of 5%, the furnace is cooled to 600° C. within 90 minutes. The annealed material is removed and air-cooled to room temperature. This is followed by wet grinding, an etching step with diluted nitric acid, and a one-off washing process. The solids obtained are then separated off by filtration and mixed, for the purpose of post-doping, again with 4 ml of a copper sulphate solution (16 g CuSO$_4$ per liter). After another intensive homogenization, the material mixture is finally tempered at 500° C. for 180 min. The final processing steps comprise renewed wet grinding, which is required to set the desired grain size distribution of the synthesized luminophore particles, and the subsequent final washing, drying, and sieving processes.

The X-ray diffraction diagram of the reference luminophore measured with the aid of a diffractometer is shown in FIG. 1. It consists of numerous line-like interferences, which can be assigned to the two different, cubic, and hexagonal structure types of zinc sulfide. The peaks marked with the letter h and the respective Miller indices in brackets represent the hexagonal phase of the powdered luminophore sample, while the reflections marked with the letter k and the relevant Miller indices in this case depict the proportionate cubic crystal structure of the sample. Superpositions of hexagonal and cubic interferences were denoted by the letter combination h+k.

Based on the measured diffractogram and the quantitative phase analysis based thereon, relative phase portions of 35% for the hexagonal and 65% for the cubic crystal structure could be determined for the structural status of the reference luminophore.

The expression of the relative structural phase portions in the luminophore is influenced to a large extent by the preparation conditions used in the production of the luminophore, among other factors. However, this also means that the corresponding structural status of the luminophore samples can be modified by changing certain synthesis parameters. This is exemplified by the following table, in which important data for the characterization of the synthesis conditions and the structure and luminescence properties of selected copper-doped zinc sulfide luminophores are compiled:

| Luminophore | Main annealing process | | Phase fraction | Electro-luminescence | | Thermo-luminescence | |
|---|---|---|---|---|---|---|---|
| | T/° C. | t$_{down}$/ min | hexagonal % | λ$_{max}$/ nm | Int./ % | T$_{max}$/ % | Int/ % |
| Luminophore 1 | 1,100 | 140 | 4 | ≈460 | 10 | 40 | 98 |
| Luminophore 2 | 1,100 | 120 | 8 | ≈650 | 66 | 78 | 190 |
| Luminophore 3 | 1,200 | 120 | 20 | ≈650 | 143 | 120 | 160 |
| Reference luminophore 4 | 1,200 | 90 | 35 | ≈650 | 100 | 128 | 100 |
| Luminophore 5 | 1,200 | 40 | 55 | ≈650 | 90 | 130 | 45 |

In the table above, the information on the electroluminescence and thermally stimulated luminescence properties relates to the wavelength maximum λ$_{max}$ of the corresponding EL emission spectrum and the temperature maximum T$_{max}$ of the glow curve for thermally stimulated luminescence recorded for the respective luminophore under comparable conditions. The data given for the percentage intensities refer to the corresponding measured values determined for the reference luminophore, which were set to 100 in each case.

It should be emphasized that all the luminophores listed in the table—apart from the differences specifically explained here—have the same luminophore composition and that they are all based on the method described above under largely the same manufacturing conditions, i.e. the same form of batch preparation, the same crucible and furnace geometry, identical annealing time and annealing atmosphere, and comparability of all mechanical and thermal post-treatment steps. To obtain the different phase compositions, however, both the temperatures of the main annealing process and the cooling rates were varied.

As can be seen from the table, the three-hour high-temperature annealing of the batch mixtures was carried out at temperatures of 1,100° C. and 1,200° C. The characteristic values given in the table for the different set cooling rates t$_{down}$ relate to the time intervals between the end of the main annealing process and the respective attainment of a cooling temperature of 600° C.

Depending on the variations made in the preparation conditions, relative hexagonal phase portions in the range from 4% to 55% were obtained for the resulting zinc sulfide luminophores.

Figure 2:
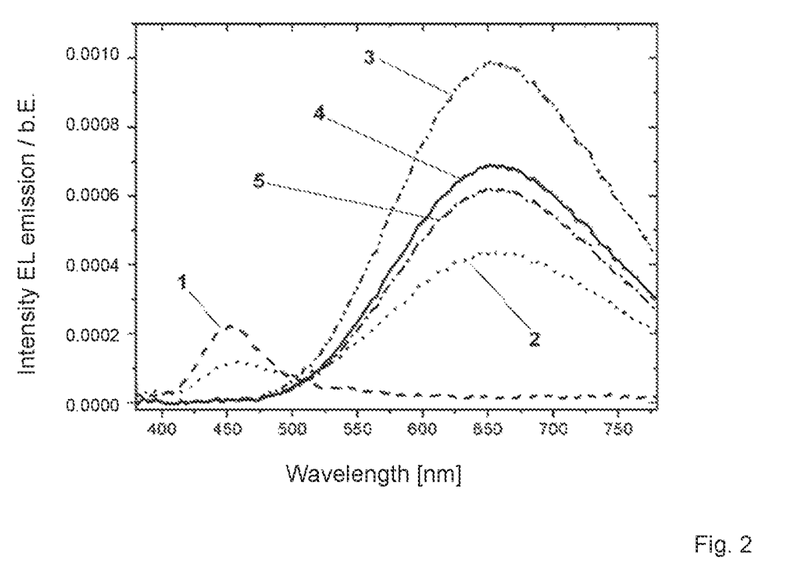
FIG. 2 shows electroluminescence emission spectra of selected zinc sulfide luminophores activated exclusively with copper.

FIG. 2 shows the emission spectra resulting from the excitation of the luminophore samples listed in the table above with an alternating electric field. The high-voltage alternating field has an excitation voltage of 30 kV and an excitation frequency of 30 kHz. The electroluminescence emission spectra show that those luminophore samples that were produced at comparatively low annealing temperatures and low cooling rates and which, for this reason, have comparatively low hexagonal structure components, as in the case of luminophore sample 1 (emission spectrum 1), are however characterized by exclusively blue electroluminescence or, as in the case of luminophore sample 2 (emission curve 2), by blue electroluminescence that is at least partially still present.

As the emission curves 3, 4, and 5 of FIG. 2 show, from a relative hexagonal phase fraction of about 10% and in particular from a relative hexagonal phase fraction of about 20%, the highly broadband emissions in the deep red spectral range, which are preferred for the formation of the security features according to the invention, dominate clearly with intensity maxima in the range around 650 nm. The intensities of the measured electroluminescence increase significantly up to a hexagonal phase fraction of about 20%, after which it decreases slightly as the hexagonal structural characteristics become even more pronounced.

Figure 3:
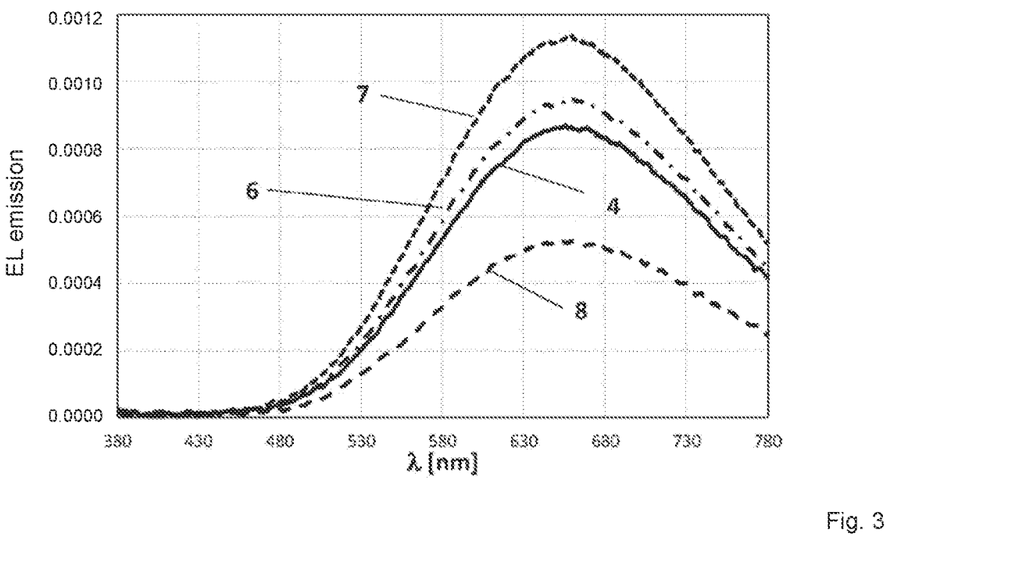
FIG. 3 shows electroluminescence emission spectra of variants of the zinc sulfide luminophore additionally doped with cobalt.

FIG. 3 shows electroluminescence emission spectra 6 to 8 of modified zinc sulfide luminophores, these luminophores having an additional cobalt co-doping in addition to the copper activation. For comparison purposes, the emission curve 4 of the reference luminophore doped exclusively with copper was also included in FIG. 3. FIG. 3 shows that the additional incorporation of cobalt ions into the copper-doped ZnS basic lattice of the zinc sulfide luminophore allows an increase in the efficiency of the electroluminescence and further stabilization of the special emission characteristics.

The preparation of the co-doped luminophore samples (emission curves 6 to 8) was carried out under the same conditions as those used for the synthesis of the reference luminophore activated exclusively with copper (emission curve 4). As in the case of the reference luminophore, uniform values of 500 ppm were again set for the molar proportions of the copper activator ions, while values of 5 ppm were specified for the molar proportions of the cobalt ions (emission curve 6), 10 ppm (emission curve 7), or 20 ppm (emission curve 8).

Figure 4:
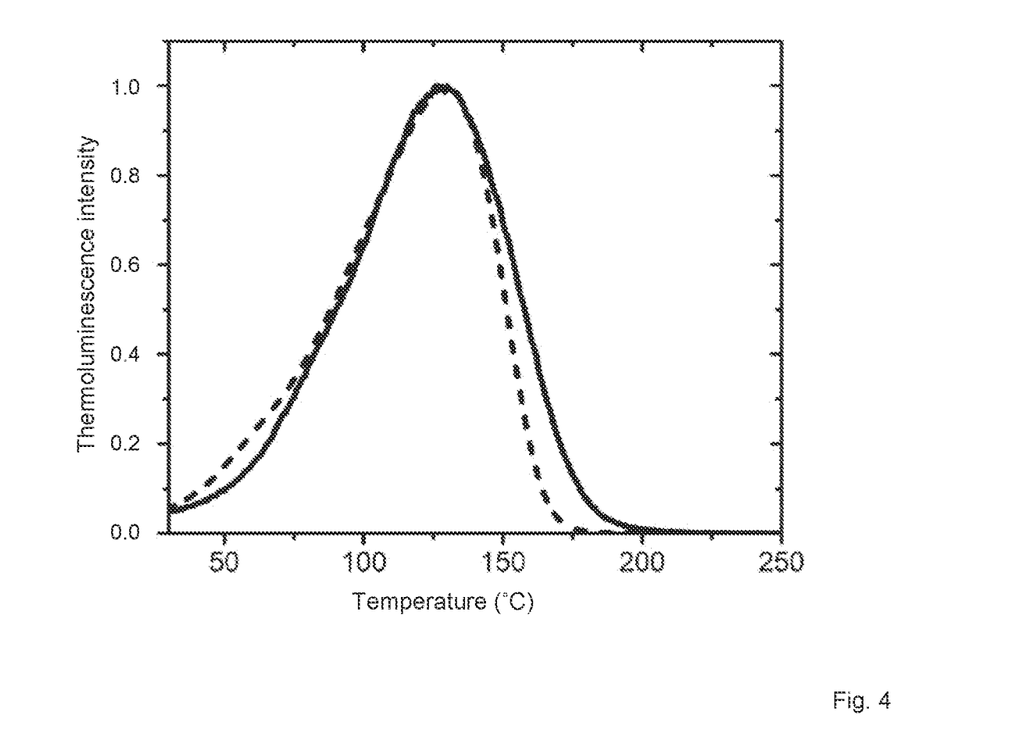
FIG. 4 shows glow curves for thermally stimulated luminescence of the zinc sulfide reference luminophore and a security feature according to the invention comprising this luminophore.

FIG. 4 shows a comparison of the exclusive glow curves for thermally stimulated luminescence that were determined for the reference luminophore in powder form and an embodiment of the security feature that has this reference luminophore, with this security feature being positioned on a banknote substrate. In this comparison, the glow curve for thermoluminescence of the reference luminophore in powder form is shown with a solid line, while the glow curve for thermoluminescence of the security feature is shown with a dashed line.

In both cases, the samples to be tested were first heated up to 250° C. in order to be able to remove stored energies in this way, if necessary by appropriate daylight excitation. This primary baking procedure, aimed at ensuring a high level of reproducibility of the subsequent standard TSL measurements or OSL measurements, was used in all relevant investigations.

After the cooling had taken place, the samples prepared in this way were excited under defined conditions with the aid of a 340 nm laser in order to fill the traps responsible for the thermally stimulated luminescence of the samples as completely as possible. In all cases, there was a pause of 20 seconds before reading out the stored light sums by heating the samples at a rate of 5 K/s up to a final temperature of 250° C. The integral intensities of the radiation emitted by the samples as a result of the thermal energy supplied could be detected with the aid of a TSL/OSL reader from RISØ (model DA-15). The graphical representation of their temperature dependence results in the curves shown in FIG. 4.

It becomes clear that the two curves have practically the same temperature maxima at around 130° C. and that they differ only slightly from one another with regard to the shape of the curve. This means that the exclusive thermally stimulated luminescence characteristic of the luminophore of the security feature according to the invention is retained even when the luminophore is processed into the security feature, in particular when it is applied on and/or in corresponding value and security documents, such as banknotes, ID cards, passports, and driver's licenses, or also bank or credit cards.

The two glow curves for thermoluminescence shown are glow curves normalized on the intensity side. However, the differences in the measured intensities are comparatively small. With otherwise the same measurement conditions, the intensities of the thermally stimulated luminescence signals measured for one and the same luminophore depend in particular on the thickness of the respective luminophore layer.

In the extensive investigations carried out in this context, it was also possible to show that the exclusive TSL signals as well as the signals for the optically stimulated luminescence of the luminophore of the security feature according to the invention can also be reliably verified in the case of those solid concentrations that are to be regarded as typical for security colors containing pigments and the print design obtained using these colors.

It should also be pointed out at this point that these investigations also ensured that all carrier materials commonly used for the creation of value and security documents have sufficient stability to withstand the thermal treatment required for repeated reading of the thermally stimulated luminescence signals up to 250° C. without damaging these materials and the security features placed on and within them.

Figure 5:
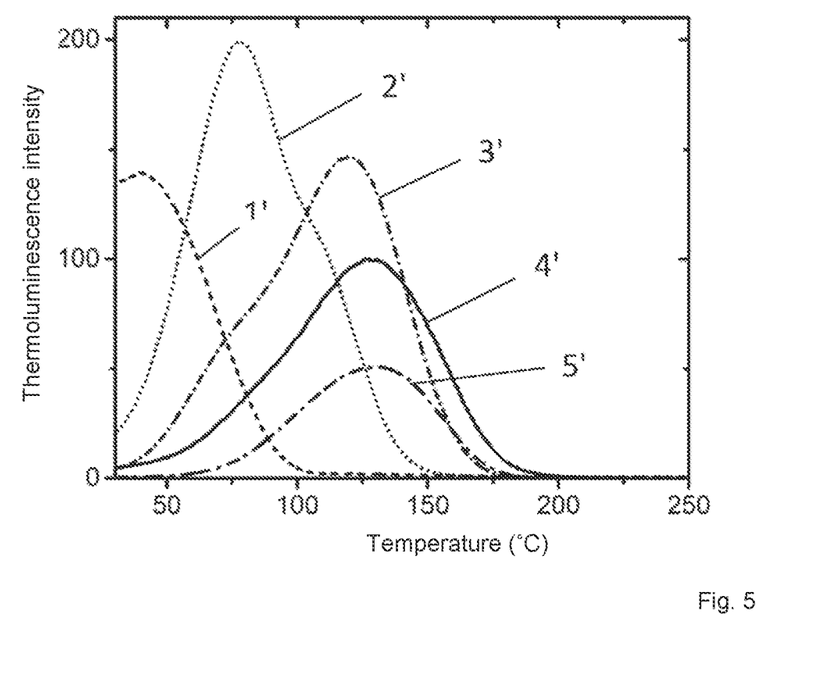
FIG. 5 shows TSL glow curves of selected variants of the zinc sulfide luminophore with different hexagonal phase portions.

FIG. 5 shows the TSL glow curves 1' to 5' of the zinc sulfide luminophores 1 to 5 described in the table above. In this case, the curves were not normalized so that the intensity differences determined under the same measurement conditions are shown.

In addition, it becomes clear that the temperature maxima of the glow curves of the investigated luminophores shift to higher temperatures under the influence of the increasing, preparatively adjusted hexagonal phase portions given in the table above.

Figure 6:
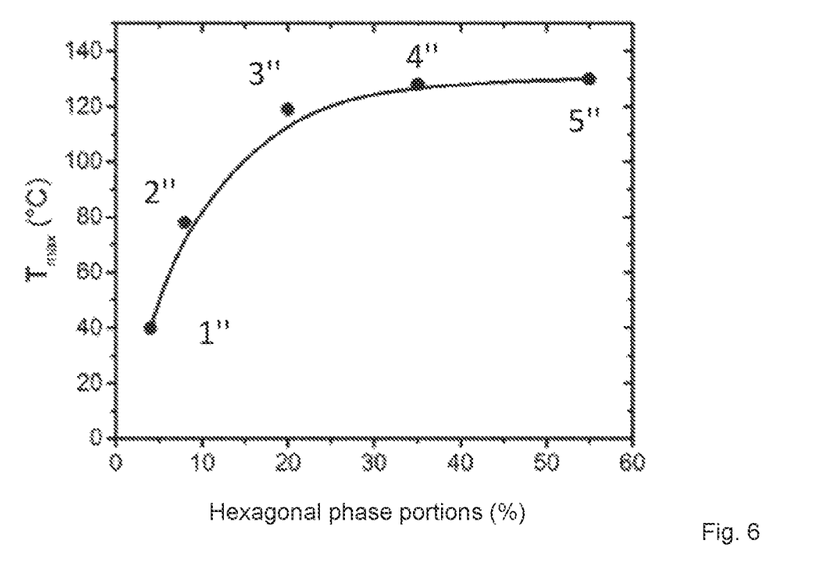
FIG. 6 shows a relationship between the temperature maxima of the TSL glow curves shown in FIG. 5 and the hexagonal phase portions of the different variants of the zinc sulfide luminophore.

FIG. 6 shows a relationship between the temperature maxima $T_{max}$ of the TSL glow curves shown in FIG. 5 and the hexagonal phase portions of the luminophores examined. It is found that, for the temperature maxima of the glow curves, values in the range between 120° C. and 150° C., which is preferred for the purposes of the invention, are only reached from a hexagonal phase fraction of about 10%.

Figure 7:
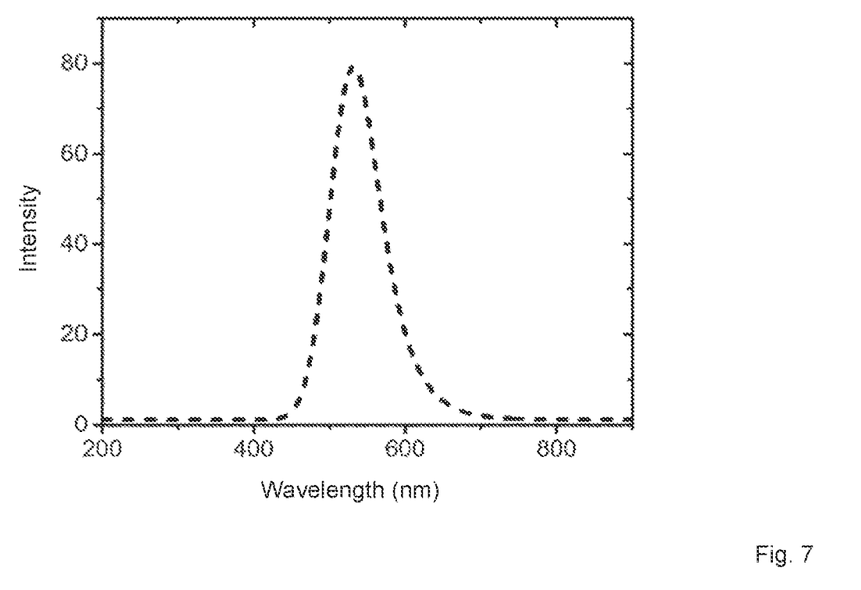
FIG. 7 shows an emission spectrum for thermally stimulated luminescence of a preferred embodiment of the security feature according to the invention.

FIG. 7 shows an emission spectrum for thermally stimulated luminescence of a preferred embodiment of the security feature according to the invention, which comprises the reference luminophore described above (luminophore 4 in the table). Surprisingly, this emission spectrum for thermally stimulated luminescence, in contrast to that for the stationary electroluminescence of the luminophore, is characterized by a comparatively narrow-band emission with an emission maximum at around 540 nm.

FIG. 8 again shows the TSL glow curve of the reference luminophore compared to the TSL glow curves of electroluminescent luminophores A, B, C, D according to the prior art, such as are used in thick-film electroluminescent displays, for example. The reference luminophore, as used in the security feature according to the invention, has electroluminescence in the deep-red range of the electromagnetic spectrum. In contrast, the electroluminescent luminophores B and D exhibit electroluminescence in the blue spectral range of visible light, while the luminophores A and C emit in the green range after excitation with the aid of alternating electrical fields. The previously known electroluminescent luminophores A-D are EL pigments from different manufacturers. All normalized TSL glow curves shown were measured under the same conditions.

Figure 8:
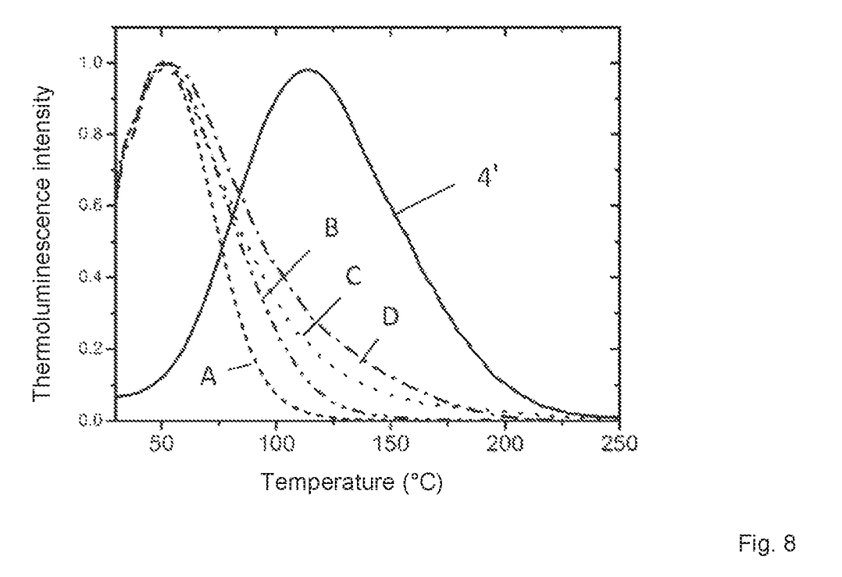
FIG. 8 shows the TSL glow curve of the zinc sulfide reference luminophore compared to the TSL glow curves of prior art electroluminescent luminophores.

In contrast to the characteristic glow curve for thermally stimulated luminescence of the zinc sulfide reference luminophore of the security feature according to the invention, the glow curves of all electroluminescent luminophores A, B, C, D included in the comparison have temperature maxima that are only slightly above a temperature of 50° C. Unlike in the case of the zinc sulfide luminophore of the security feature according to the invention, the relatively flat traps responsible for the occurrence of effects of thermally stimulated luminescence in this low-temperature range can already be emptied by adding relatively low energies without additional stimulation, for example by corresponding fluctuations in room temperature in the form of weak-intensity afterglow processes.

The use of the zinc sulfide luminophore with specifically influenced phase relationships in the security feature according to the invention, on the other hand, opens up the possibility of using the exclusive thermally stimulated luminescence characteristic as a sole or additional criterion for verifying the authenticity of the value and security documents equipped with the security feature according to the invention.

As an alternative to adding thermal energy, the electrons stored in the characteristic lattice traps of the zinc sulfide luminophore of the security feature according to the invention can be freed from the traps after appropriate excitation, but also by targeted optical stimulation and returned to the electronic ground state with the emission of a corresponding luminescence radiation.

In contrast to the glow curves characteristic of thermoluminescence, specific decay curves are measured for optically stimulated luminescence, which can also be used according to the invention as a criterion for authenticity.

Figure 9:
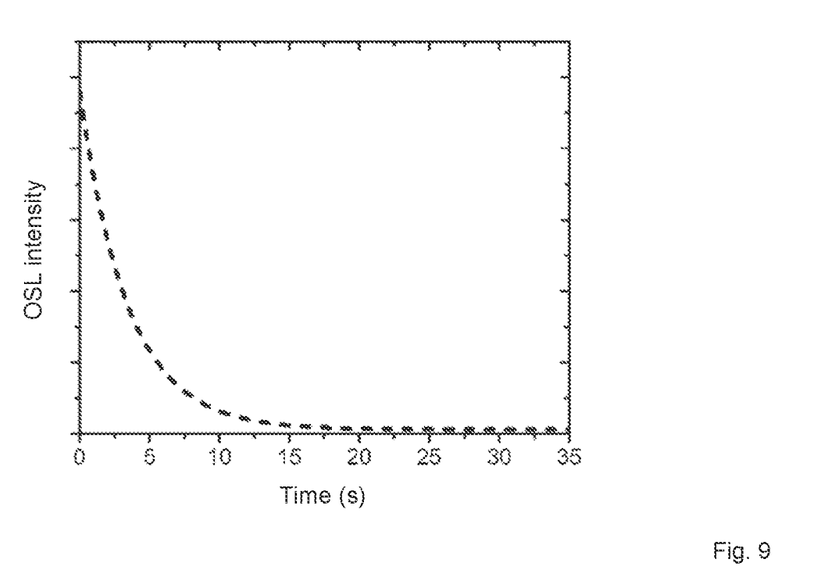
FIG. 9 shows a characteristic decay curve for an optically stimulated luminescence of a preferred embodiment of the security feature according to the invention.

FIG. 9 shows a characteristic decay curve for an optically stimulated luminescence of a preferred embodiment of the security feature according to the invention, which comprises the zinc sulfide reference luminophore described above, whose glow curve for thermally stimulated luminescence is shown in FIG. 4. The security feature is positioned on a banknote substrate. After filling the traps using the 340 nm laser excitation source again and observing a corresponding pause of 20 seconds, the stored light sum was read out by optical stimulation with the help of an intensive 750 nm laser radiation. Previously conducted preliminary tests had shown that the greatest signal-to-noise ratio can be achieved when using such a laser wavelength.

The spectral distribution of the light emitted by the zinc sulfide luminophore of the security feature according to the invention after optical stimulation corresponds to that which was determined in the corresponding TSL measurements. In view of the wavelength maximum of this emission found at about 536 nm and the excitation wavelength of 750 nm, the radiation conversion resulting from the optical stimulation of the security feature according to the invention can be classified as anti-Stokes luminescence.

The exact shape of the decay curves resulting from the optical stimulation of luminophores is influenced by various factors, including the laser power. However, the decay curves measured under defined conditions represent exclusive luminophore characteristics which can be verified with a high degree of certainty at a high readout rate and without any thermal stressing of the security feature according to the invention.

Figure 10:
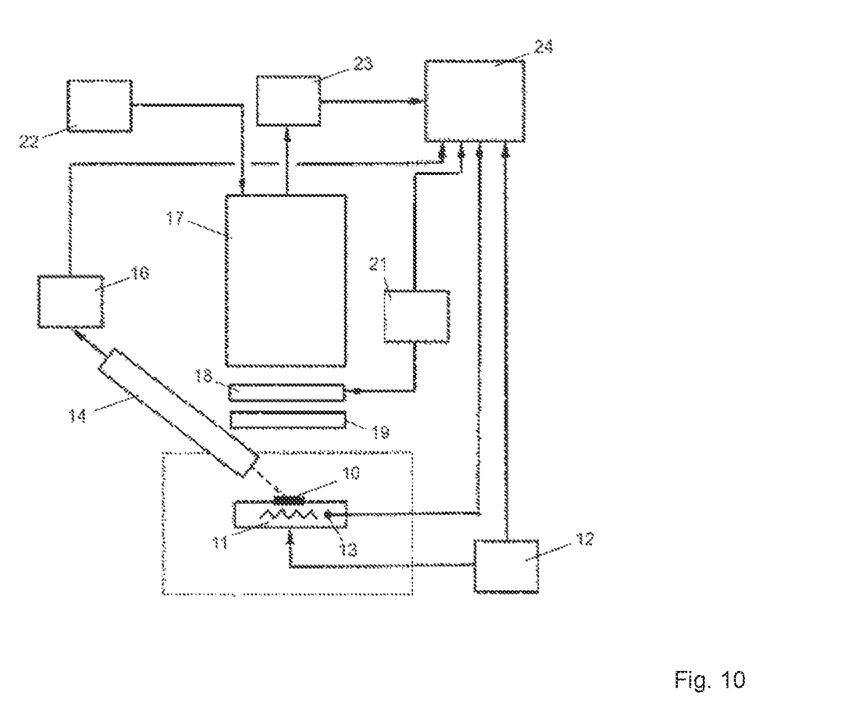
FIG. 10 shows a schematic representation of an optical arrangement for measuring the spectra and curves shown in FIG. 4 to 9.

FIG. 10 shows a schematic representation of an optical arrangement for measuring the spectra and curves shown in FIG. 4 to 9. The zinc sulfide luminophore or the security feature forms a sample 10. The arrangement comprises a heating device 11 with which the sample 10 can be heated for the purpose of thermal stimulation. The heating device 11 can be controlled with a heating controller 12. A thermocouple 13 is arranged on the heating device 11 in order to be able to measure the temperature generated by the heating device 11.

The arrangement also comprises a laser 14 with which the sample 10 can be excited optically. The laser 14 can be tuned and controlled with a laser controller 16. The laser 12 can also be used to fill, by excitation, the special lattice traps responsible for the occurrence of the exclusive TSL or OSL effects of the security feature according to the invention. The shutter 18 in front of the light detection device 17 remains closed during this excitation. The optical filters 19 are selected in such a way that the wavelengths emitted by the sample 10 during the respective thermal or optical excitation can be measured with high efficiency, while all other wavelengths are blocked.

The arrangement also comprises a light detection device 17, which can be formed, for example, by a photomultiplier tube. An optical shutter 18 and one or more optical filters 19 are arranged between the light detection device 17 and the sample 10. The shutter 18 is controlled with a shutter controller 21. A high-voltage unit 22 serves to supply the light detection device 17 with a high voltage. An output signal from the light detecting device 17 is amplified by an amplifier 23 and fed to a computer 24. The computer 24 is also used to control the heating controller 12, the shutter controller 21, and the high-voltage unit 22. An output signal from the thermocouple 13 is also fed to the computer 24.

LIST OF REFERENCE SIGNS

1 Emission spectrum of the electroluminescence of a zinc sulfide luminophore activated exclusively with copper 1
2 Emission spectrum of the electroluminescence of a zinc sulfide luminophore activated exclusively with copper 2
3 Emission spectrum of the electroluminescence of a zinc sulfide luminophore activated exclusively with copper 3
4 Emission spectrum of the electroluminescence of a zinc sulfide luminophore activated exclusively with copper 4 (reference luminophore) Emission spectrum of the electroluminescence of a zinc sulfide luminophore activated exclusively with copper 5
1' Glow curve for thermoluminescence (thermally stimulated luminescence) of luminophore 1
2' Glow curve for thermoluminescence of luminophore 2
3' Glow curve for thermoluminescence of luminophore 3
4' Glow curve for thermoluminescence of luminophore 4 (reference luminophore)
5' Glow curve for thermoluminescence of luminophore 5
1" Temperature maximum of the glow curve of the luminophore 1
2" Temperature maximum of the glow curve of the luminophore 2
3" Temperature maximum of the glow curve of the luminophore 3
4" Temperature maximum of the glow curve of the luminophore 4 (reference luminophore)
5" Temperature maximum of the glow curve of the luminophore 5
6 Electroluminescence emission spectrum of a luminophore 6 additionally co-doped with 5 ppm cobalt 7 Electroluminescence emission spectrum of a luminophore 7 additionally co-doped with 10 ppm cobalt
8 Electroluminescence emission spectrum of a luminophore 8 additionally co-doped with 20 ppm cobalt
10 Sample
11 Heating device
12 Heating controller
13 Thermocouple
14 Laser
15 —
16 Laser controller
17 Light detection device
18 Optical shutter
19 Optical filter
20 —
21 Shutter controller
22 High-voltage unit
23 Amplifier
24 Computer

The invention claimed is:

1. Security feature for a security or value document, wherein the security feature comprises a zinc sulfide luminophore in the form of particles, wherein the zinc sulfide luminophore has the following general chemical formula:

$ZnS:Cu_x,M_y,X_z$ where:
M=one or more elements from a group comprising the chemical elements Co, In, and Ni
X=one or more elements from a group comprising the halides F, Cl, Br, and I;
$0<x\leq0.002$;
$0\leq y\leq0.00015$; and
$0\leq z\leq0.00050$;
wherein the particles each have cubic phase portions and hexagonal phase portions, wherein the zinc sulfide luminophore emits a first luminescence radiation in the spectral range between 580 nm and 780 nm when excited by an electric field, and wherein the zinc sulfide luminophore emits a second luminescent radiation in the visible spectral range when thermally stimulated and previously excited by means of UV radiation.

2. Security feature according to claim 1, characterized in that the hexagonal phase portions in the individual particles are on average in the range between 20% and 40%.

3. Security feature according to claim 1, characterized in that the first luminescence radiation has an emission spectrum which consists of an emission band in the deep-red spectral range.

4. Security feature according to claim 1, characterized in that the second luminescence radiation is emitted in the green spectral range.

5. Security feature according to claim 1, characterized in that the second luminescence radiation has a maximum with a wavelength in the spectral range between 520 nm and 550 nm.

6. Security feature according to claim 1, characterized in that the second luminescence radiation emitted as a result of the thermal stimulation has an integral intensity maximum (thermoluminescence glow curve) in the temperature range between 120° C. and 150° C.

7. Security feature according to claim 1, characterized in that the zinc sulfide luminophore also emits the second luminescence radiation when it is optically stimulated after previous excitation.

8. Security feature according to claim 1, characterized in that the particles have an average grain size between 2 μm and 50 μm, in particular between 2 μm and 20 μm.

9. Security feature according to claim 1, characterized in that the zinc sulfide luminophore has the following general chemical formula:

$ZnS:Cu_x,Co_y$, or $ZnS: Cu_x$, where $0<x<0.002$ and $0<y\leq0.00015$.

10. Security document or value document comprising a security feature according to claim 1.

11. Method for detecting and/or verifying a security feature having a luminophore according to claim 1 in a security or value document, comprising the following steps:
 a. exciting the luminophore by an alternating electric field;
 b. checking whether, as a result of the excitation by the alternating electric field in step a., a first luminescence radiation is emitted in the spectral range between 580 nm and 780 nm;
 c. exciting the luminophore by UV radiation;
 d. stimulating the excited luminophore by thermal stimulation or by optical stimulation of the luminophore; and
 e. checking whether a second luminescence radiation in the visible spectral range is emitted as a result of the stimulation.

12. Method according to claim 11, characterized in that a confirmation signal is respectively generated if, in one of the performed test steps b. and/or e., the occurrence of the checked first, respectively second, luminescence radiation is determined.

13. Method according to claim 11, characterized in that the luminophore is heated to a temperature of at most 250° C. for thermal stimulation.

14. Method according to claim 11, characterized in that, in the case of thermal stimulation, in step e., the intensity of the emitted second luminescence radiation is compared with a predetermined thermoluminescence glow curve.

15. Method according to a claim 11, characterized in that, in the case of the optical stimulation, in step e., the intensity of the emitted second luminescence radiation is compared with a predetermined decay curve.

* * * * *